United States Patent
Funari

(10) Patent No.: US 9,057,454 B2
(45) Date of Patent: Jun. 16, 2015

(54) FLUSH VALVE ACTUATOR

(71) Applicant: Zurn Industries, LLC, Erie, PA (US)

(72) Inventor: Michael A. Funari, Apex, NC (US)

(73) Assignee: ZURN INDUSTRIES, LLC, Milwaukee, WI (US)

( * ) Notice: Subject to any disclaimer, the term of this patent is extended or adjusted under 35 U.S.C. 154(b) by 420 days.

(21) Appl. No.: 13/667,123

(22) Filed: Nov. 2, 2012

(65) Prior Publication Data

US 2013/0112905 A1   May 9, 2013

Related U.S. Application Data

(60) Provisional application No. 61/554,570, filed on Nov. 2, 2011.

(51) Int. Cl.
*F16K 31/385* (2006.01)
*E03D 3/06* (2006.01)
*E03D 5/09* (2006.01)

(52) U.S. Cl.
CPC .............. *F16K 31/3855* (2013.01); *E03D 3/06* (2013.01); *E03D 5/09* (2013.01)

(58) Field of Classification Search
CPC ... F16K 31/3855; F16K 31/38; F16K 31/385; E03D 5/09; E03D 5/092; E03D 3/06
USPC ..................... 251/40, 38, 33; 4/324
See application file for complete search history.

(56) References Cited

U.S. PATENT DOCUMENTS

| | | | |
|---|---|---|---|
| 1,416,317 A | 5/1922 | Banta | |
| 1,868,520 A | 7/1932 | Brooks | |
| 1,868,947 A | 7/1932 | Manning | |
| 2,066,086 A | 12/1936 | Wilson | |
| 2,123,356 A | 7/1938 | Glynn | |
| 2,153,904 A | 4/1939 | Wilson | |
| 2,612,187 A | 9/1952 | Romanelli et al. | |
| 2,620,826 A | 12/1952 | Johns | |
| 2,858,846 A | 11/1958 | Parker | |
| 2,916,251 A | 12/1959 | Butts | |
| 3,207,467 A | 9/1965 | Bühler | |
| 3,806,962 A | 4/1974 | Sievers | |
| 4,134,570 A | 1/1979 | Walker | |
| 4,662,602 A | 5/1987 | Johnson | |
| 5,730,415 A * | 3/1998 | Gronwick | 251/40 |
| 7,481,413 B2 | 1/2009 | Funari | |
| 7,487,950 B2 | 2/2009 | Johnson | |
| 7,556,237 B2 | 7/2009 | Johnson | |
| 7,607,635 B2 | 10/2009 | Wilson | |
| 8,322,682 B2 * | 12/2012 | Maercovich | 251/40 |
| 8,585,008 B2 * | 11/2013 | Wilson | 251/42 |
| 2007/0210271 A1 | 9/2007 | Wilson | |
| 2010/0006155 A1 | 1/2010 | Funari | |
| 2010/0012875 A1 | 1/2010 | Wilson | |

\* cited by examiner

*Primary Examiner* — John K Fristoe, Jr.
*Assistant Examiner* — Andrew J Rost
(74) *Attorney, Agent, or Firm* — The Webb Law Firm

(57) ABSTRACT

A flush actuator for use with a flush valve includes: a) a base having a bore extending therethrough between a lower portion and an upper portion; b) a plunger rod positioned within and guided by the bore of the base; and c) a handle mounted to the base, which when moved displaces the plunger rod within the bore of the base. The upper portion of the base includes a beveled nose extending from an end thereof beyond the lower portion. The plunger rod includes a body portion having a first diameter and a recessed area formed in the body portion with a second diameter that is less than the first diameter.

14 Claims, 5 Drawing Sheets

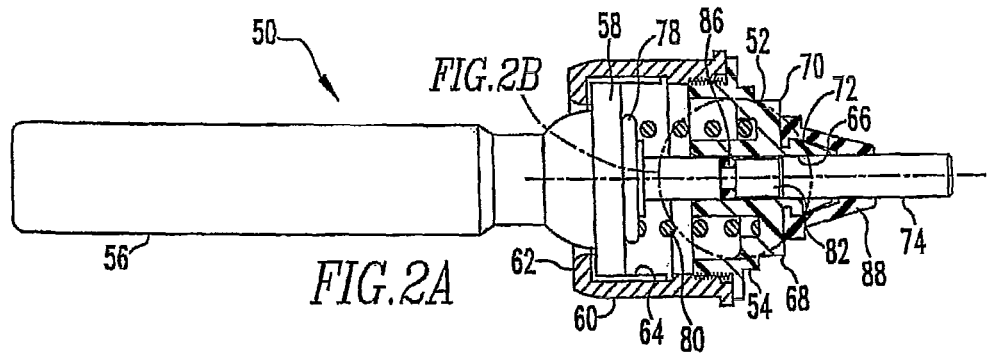
FIG. 2A
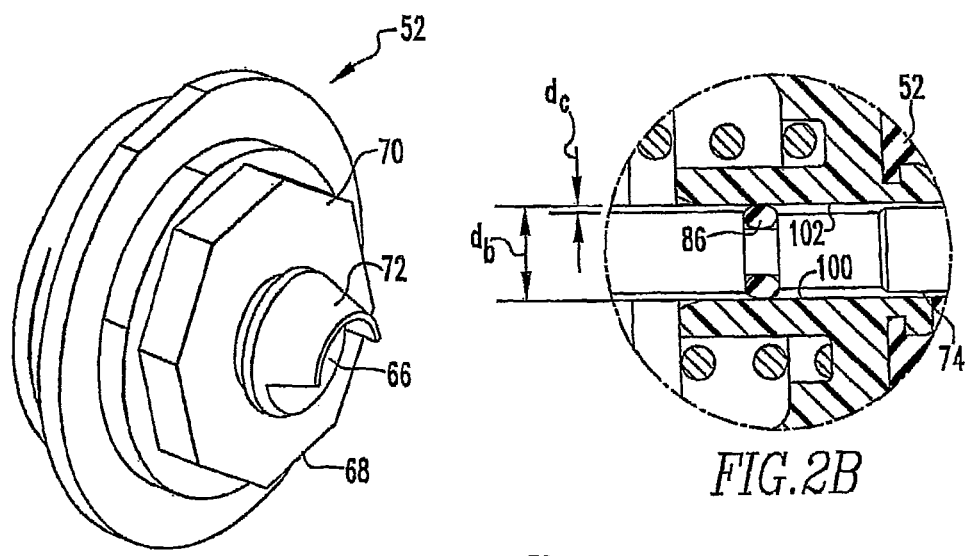
FIG. 3A
FIG. 2B
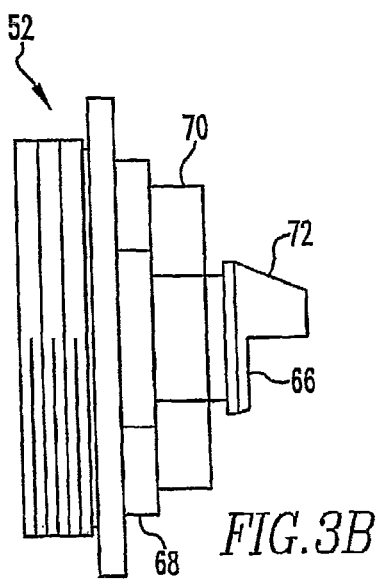
FIG. 3B

FLUSH VALVE ACTUATOR

CROSS REFERENCE TO RELATED APPLICATIONS

This application claims the benefit of U.S. Provisional Patent Application No. 61/554,570 entitled "Flush Valve Actuator" filed Nov. 2, 2011, which is hereby incorporated by reference in its entirety.

BACKGROUND OF THE INVENTION

1. Field of the Invention

The present invention relates, in general, to a flush valve for urinals and water closets and other plumbing equipment and, more particularly, to a flush actuator assembly utilized on a flush valve.

2. Description of Related Art

Flush valves in water closets, urinals, and other plumbing devices which utilize a flexible diaphragm to establish and to seal off the connection between the inlet and outlet are well known in the art. FIG. 1 illustrates a typical prior art flush valve, denoted generally as reference numeral 5. The flush valve 5 has a valve body 10, generally made of brass, which includes an inlet 12 and outlet 14 and an actuator connection 16. A barrel section 18 is positioned within the flush valve 5 such that the connection between the inlet 12 and the outlet 14 is through the barrel section 18. A valve seat 20 is formed on a top or sealing end, denoted generally as reference numeral 21, of the barrel section 18. The valve seat 20 is normally closed by a diaphragm 22 extending across the valve body 10 and defining an upper chamber 24. The diaphragm 22 has a by-pass 26 which provides fluid communication between the inlet 12 of the flush valve 5 and the upper chamber 24. The diaphragm 22 is attached at its outer edge to the valve body 10 and is clamped in place by an annular clamping rim 27 on an upper cover 11 of the valve body 10. The diaphragm 22 has a central opening 23 which allows for fluid communication between the upper chamber 24 and the outlet 14. A relief valve 28 normally closes the central opening 23 of the diaphragm 22.

The operation of the flush valve 5 is generally as follows. In the normally closed position, shown in FIG. 1, water pressure in the valve inlet 12 is communicated to the upper chamber 24 through the by-pass 26 defined in the diaphragm 22. Because the surface area which is subjected to water pressure is greater on the upper side of the diaphragm 22, the water pressure forces the diaphragm 22 down onto the sealing end 21 of the barrel section 18 (i.e., valve seat 20), thus preventing water from flowing to the outlet 14. A flush actuator assembly, denoted generally as reference numeral 30, is attached to the valve body 10 through the actuator connection 16 and moves a plunger rod 32 inwardly which contacts and displaces a relief valve post 40 of the relief valve 28 which then displaces from the valve seat 20 a valve seat seal 42 connected to the post 40.

This releases the pressure in the upper chamber 24 by allowing water to flow through the central opening 23 of the diaphragm 22 to the outlet 14. After the diaphragm 22 and the relief valve 28 move upwardly, the relief valve 28 resets itself thereby causing the valve seat seal 42 to cover the valve seat 20, thereby closing off the upper chamber 24 except for the passageway provided by the by-pass 26. Water then flows through the by-pass 26 into the upper chamber 24 refilling and repressurizing the upper chamber 24 until the diaphragm 22 is again forced against the valve seat 20, thereby closing the valve. The flush actuator assembly 30 includes a drive mechanism such as a handle 44 or another device capable of displacing the plunger rod 32 against the relief valve post 40, including a motor or solenoid well known to those skilled in the art of flush valve designs.

SUMMARY OF THE INVENTION

According to one aspect of the invention, provided is a flush actuator for use with a flush valve that includes: a) a base comprising a bore extending therethrough between a lower portion and an upper portion; b) a plunger rod positioned within and guided by the bore of the base; and c) a handle mounted to the base which when moved displaces the plunger rod within the bore of the base. The upper portion includes a beveled nose extending from an end thereof beyond the lower portion. The plunger rod includes a body portion having a first diameter and a recessed area formed in the body portion with a second diameter that is less than the first diameter. If the handle is lowered, the plunger rod travels within the bore, such that the central longitudinal axis of the plunger rod is offset from the central longitudinal axis of the bore by a first predetermined distance, and, if the handle is raised, the plunger rod travels within the bore, such that a central longitudinal axis of the plunger rod is offset from a central longitudinal axis of the bore by a second predetermined distance.

The first predetermined distance may be less than the second predetermined distance. The beveled nose of the upper portion of the base may be configured to extend 180° around an upper area of the plunger rod. A spring may be provided between the base and a first end of the plunger rod to bias the plunger rod in a retracted position. The base may include an end portion that is threaded to be compatible with matching threads on a mounting bore in a valve body of the flush valve.

According to another aspect of the invention, provided is a flush valve that includes: a) a valve body having an inlet and an outlet; b) a valve seat formed in the body between the inlet and outlet; c) a flexible diaphragm above the valve seat defining a lower chamber in fluid communication with the inlet and an upper chamber, wherein in a closed position the diaphragm is urged against and seals the valve seat and wherein in an open position the diaphragm is relaxed and spaced from the valve seat, such that the inlet is in fluid communication with the outlet; d) a diaphragm by-pass between the upper and lower chambers, whereby fluid from the inlet passes into the upper chamber and pressurizes the upper chamber to urge the diaphragm into the closed position; e) a relief valve to relieve pressure from the upper chamber, thereby allowing the diaphragm to displace from the valve seat to provide fluid communication between the inlet and the outlet, wherein the relief valve is comprised of a valve seat seal and a post longitudinally extending therefrom; and f) a flush actuator assembly mounted upon the valve body to displace the relief valve post. The flush actuator includes: i) a base comprising a bore extending therethrough between a lower portion and an upper portion; ii) a plunger rod positioned within and guided by the bore of the base; and iii) a handle mounted to the base which when moved displaces the plunger rod within the bore of the base. The upper portion may include a beveled nose extending from an end thereof beyond the lower portion. The plunger rod includes a body portion having a first diameter and a recessed area formed in the body portion with a second diameter that is less than the first diameter. If the handle is lowered, the plunger rod travels within the bore, such that the central longitudinal axis of the plunger rod is offset from the central longitudinal axis of the bore by a first predetermined distance, and, if the handle is raised, the plunger rod travels within the bore, such that a central longitudinal axis of the plunger rod is offset from a central longitudinal axis of the bore by a second predetermined distance.

Accordingly to yet another aspect of the invention, provided is a method of adjusting the fluid flow through a flush valve that includes providing a flush actuator for use with the flush valve. The flush actuator includes: i) a base comprising a bore extending therethrough between a lower portion and an upper portion; ii) a plunger rod positioned within and guided by the bore of the base; and iii) a handle mounted to the base which when moved displaces the plunger rod within the bore of the base. The upper portion includes a beveled nose extending from an end thereof beyond the lower portion. The plunger rod includes a body portion having a first diameter and a recessed area formed in the body portion with a second diameter that is less than the first diameter. The method also includes lowering the handle, such that the plunger rod travels within the bore causing the central longitudinal axis of the plunger rod to be offset from the central longitudinal axis of the bore by a first predetermined distance, thereby providing a first flush volume; and raising the handle, such that the plunger rod travels within the bore, such that a central longitudinal axis of the plunger rod is offset from a central longitudinal axis of the bore of the base by a second predetermined distance, thereby providing a second flush volume.

The first flush volume may be greater than the second flush volume. The first predetermined distance may be less than the second predetermined angle. The beveled nose of the upper portion of the base may be configured to extend 180° around an upper area of the plunger rod. The base may include an end portion that is threaded to be compatible with matching threads on a mounting bore in the valve body.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 2A is a cross-sectional view of a flush actuator assembly in accordance with the present invention;

FIG. 2B is a portion of the flush actuator assembly of FIG. 2A enlarged and exaggerated for magnification purposes;

FIGS. 3A and 3B are perspective and side plan views, respectively, of a base of the flush actuator assembly of FIG. 2A;

DETAILED DESCRIPTION OF THE PREFERRED EMBODIMENTS

Figure 1:
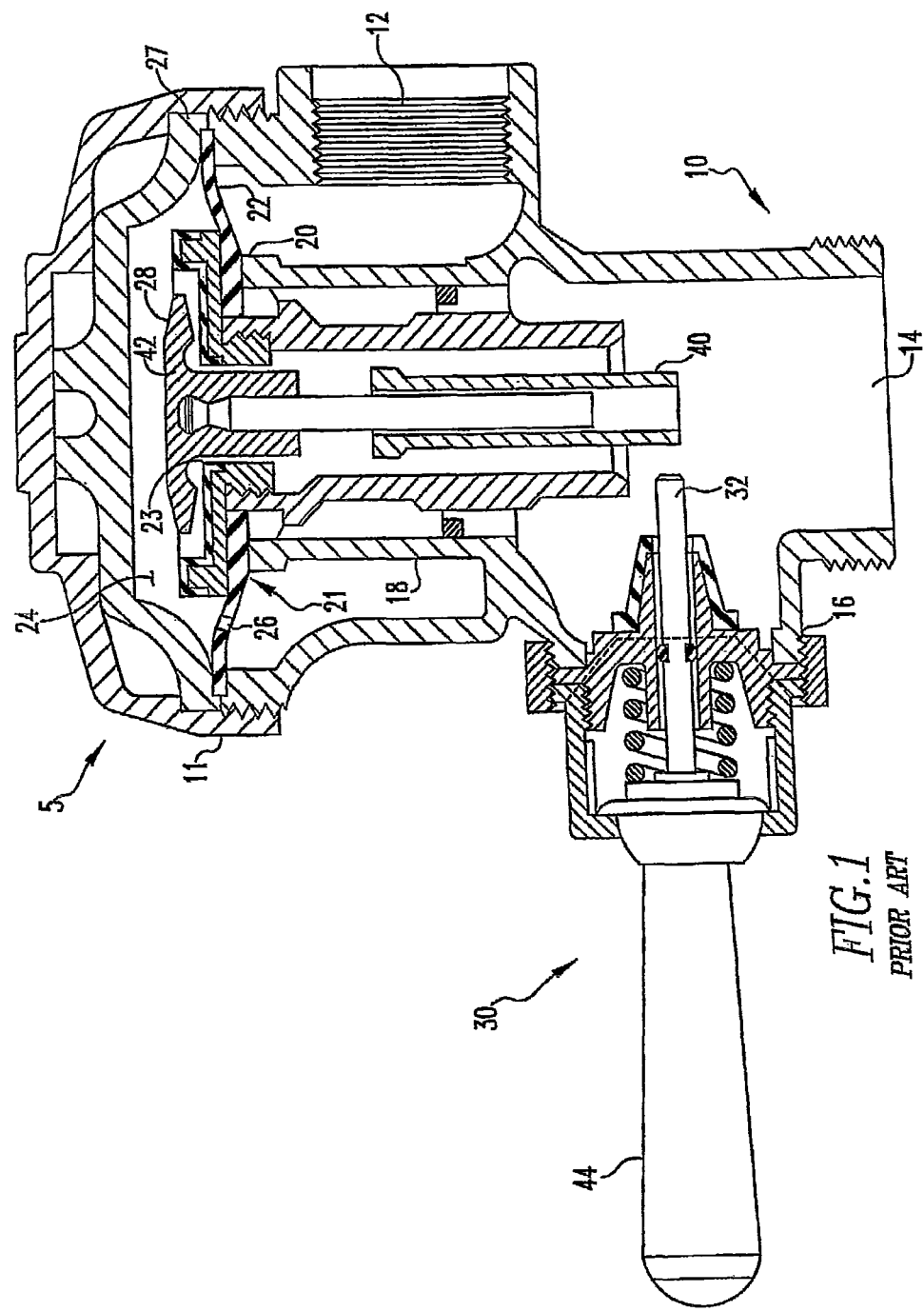
FIG. 1 is a partial sectional view of a prior art flush valve with a flush actuator assembly.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

With reference to FIGS. 2A and 2B, a flush actuator, generally denoted as reference numeral 50, for use with a flush valve, such as flush valve 5 provided in FIG. 1, is illustrated. The flush actuator 50 fits through an opening in the valve body 10 and is retained therein by a nut (not shown). Alternatively, a base or bushing 52 of flush actuator 50 may include an end portion 54 that is threaded to be compatible with matching threads (not shown) on the actuator connection 16 (FIG. 1) of the valve body 10 or the base 52 may include an end portion 54 adapted to snap within the actuator connection 16 in the valve body 10.

Flush actuator 50 includes a handle 56 which has a face plate 58 at its inner end. The face plate 58 is held within a chamber formed by an outer casing 60. An inwardly extending flange 62 on an outer end of outer casing 60 retains the face plate 58 of handle 56. A sleeve 64 may line the inside of outer casing 60 and flange 62. The inner end of outer casing 60 is threaded to base 52.

With reference to FIGS. 3A and 3B and with continued reference to FIGS. 2A and 2B, base 54 includes a bore 66 extending therethrough between a lower portion 68 and an upper portion 70. The bore 66 has an inner diameter $d_B$ of about 0.25 inches and this diameter $d_B$ remains substantially constant along the length of the bore 66. Upper portion 70 of base 52 includes a beveled nose 72 extending from an end thereof beyond lower portion 68. This beveled nose 72 extends 180° around the circumference of bore 66 as shown in FIG. 3A.

Figure 4A:
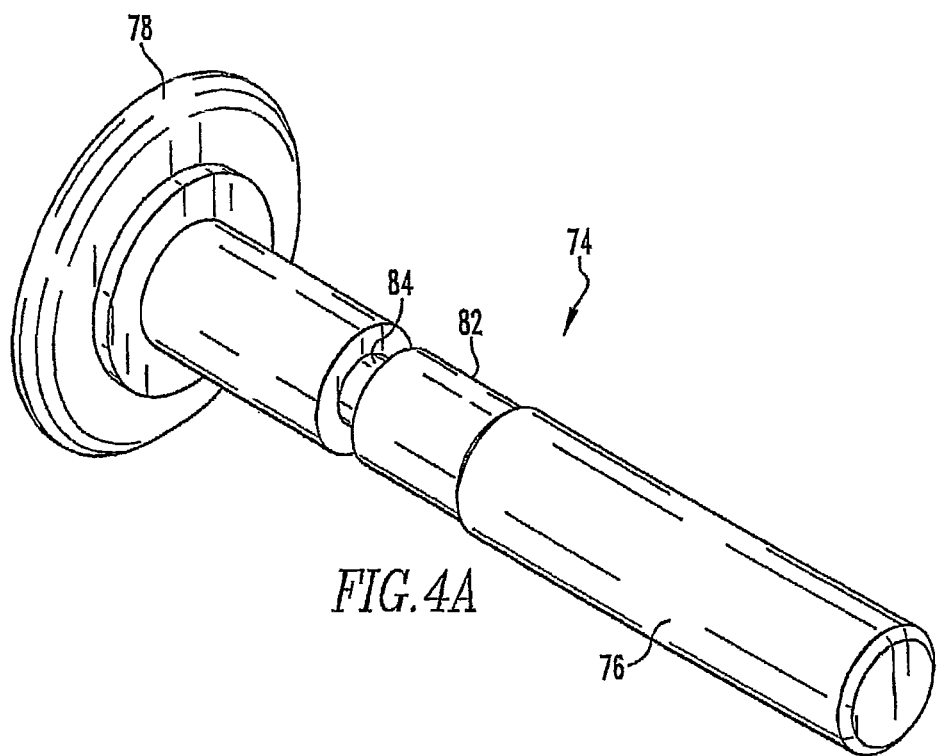
FIGS. 4A and 4B are perspective and side plan views, respectively, of a plunger rod of the flush actuator assembly of FIG. 2A.
Figure 4B:
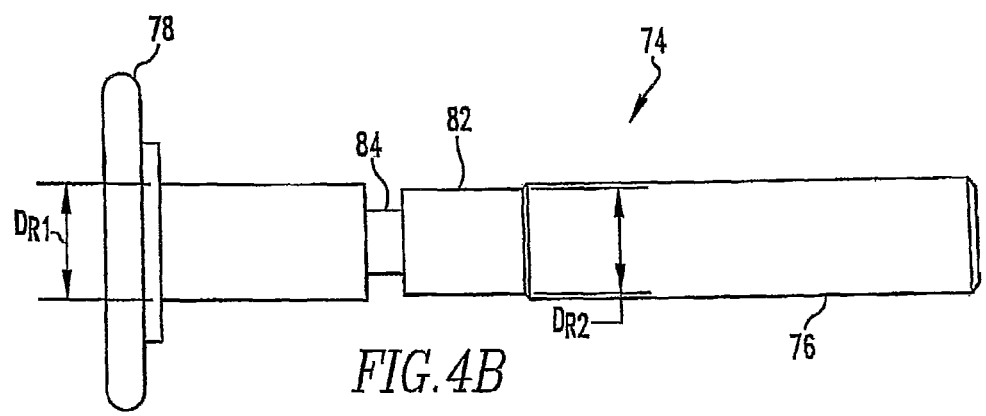

With reference to FIGS. 4A and 4B and with continued reference to FIGS. 2A and 2B, a plunger rod 74 is positioned within and guided by the bore 66 of the base 52. The plunger rod 74 includes a body portion 76 having a head 78 on an outer end thereof. The head 78 engages the face plate 58 of the handle 56. A compression spring 80 or other suitable biasing device fits between the base 52 and the head 78 to urge the plunger rod 74 into engagement with the face plate 58 of handle 56. The compression spring 80 may be a ground or a non-ground spring. The body portion 76 has a first diameter $d_{R1}$ and a recessed area 82 formed therein. The recessed area 82 has a second diameter $d_{R2}$ that is less than the first diameter $d_{R1}$. The first diameter $d_{R1}$ may be approximately 0.246 inches and the second diameter $d_{R2}$ may be approximately 0.236 inches. Accordingly, a clearance $d_C$ of approximately 0.004 inches is provided around the body portion 76 when it is positioned within the bore 66. The body portion 76 may further include a recess 84 provided around a circumference thereof An O-ring 86 is located within the recess 84 about body portion 76 within the bore 66 of the base 52 to prevent water from leaving the valve body 10 through the flush actuator 50. The O-ring 86 has an outer diameter that is greater than the inner diameter of the bore 66. In addition, a sealing sleeve 88 made of a resilient material, such as a thermoplastic elastomer, is attached to the base 52 and fits over the plunger rod 74 to provide a fluid seal.

With reference to FIGS. 5-8, the manner in which flush actuator 50 operates flush valve 5 by acting upon relief valve post 40 will be described. As discussed hereinabove, handle 56 includes a face plate 58 that is captured by a shoulder in the outer casing 60. The head 78 of plunger rod 74 is urged against the face place 58 of the handle 56 by the spring 80. When the handle 56 is displaced, the face plate 58 pivots against the shoulder of the outer casing 60, thereby pushing the plunger rod 74 toward the relief valve post 40. The displacement of the handle 56 is limited by the maximum travel of the plunger rod 74 since the plunger rod head 78 bottoms out against the base 52. In that respect, the maximum displacement of the relief valve post 40 is predetermined by maximum travel at the plunger rod 74. Additionally, the magnitude of the displacement of the relief valve post 40 directly affects the volume of water passing through the flush valve 5 during a single flush cycle. In particular, the greater the magnitude of the relief valve post 40 displacement, the greater the volume of water passing through the flush valve 5 during a flush cycle.

It should be appreciated that while the throw of the plunger rod 74 may be altered by moving the handle 56 a distance less than its maximum travel, the present invention is based upon adjusting the displacement of the relief valve post 40 when the handle 56 during normal operation is extended to its maximum travel.

The flush actuator 50 in accordance with the present invention allows flush valve 5 to provide different flush volumes that are selected by choosing the direction of actuation of the handle 56. Actuation of the handle 56 in an upward vertical direction causes the plunger rod 74 to contact the relief valve post 40 at a lower point compared to when the handle is downwardly actuated. The lower point of contact allows the relief valve post 40 to clear the plunger rod 74 sooner, resulting in earlier closure of the relief valve 28 and reduced open time for the flush valve 5, thereby leading to a reduced flow amount through the flush valve 5. On the other hand, actuation of the handle 56 in a downward direction results in a full flush cycle.

Figure 5:
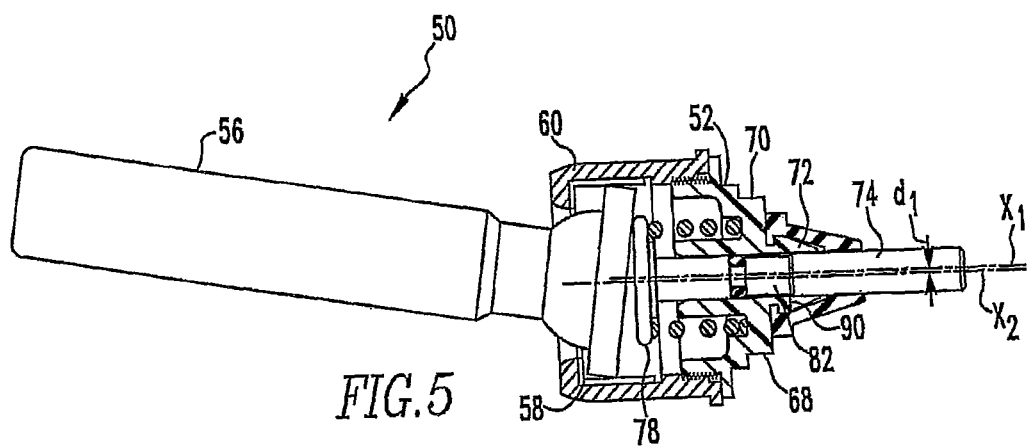
FIG. 5 is a cross-sectional view of the flush actuator assembly of FIG. 2A with a handle thereof in a partially raised position.
Figure 6:
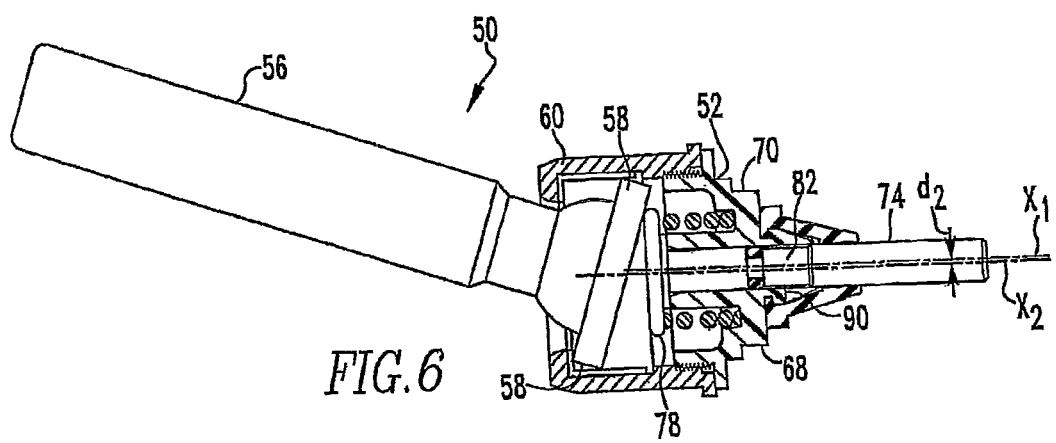
FIG. 6 is a cross-sectional view of the flush actuator assembly of FIG. 2A with a handle thereof in a fully raised position.

With specific reference to FIGS. 5 and 6, as a user raises handle 56, the face plate 58 pivots against the shoulder of the outer casing 60, thereby pushing the plunger rod 74 toward the relief valve post 40. The forces generated by the handle 56 and the spring 80 force the plunger rod 74 to travel within the bore 66. The central longitudinal axis of the plunger rod $x_2$ is offset by a distance $d_1$ from the central longitudinal axis of the bore $x_1$, such that the recessed area 82 of body portion 76 of plunger rod 74 begins to approach an edge 90 of the lower portion 68.

As the user continues to move the handle 56 in an upward direction, the recessed area 82 of body portion 76 of plunger rod 74 rides along edge 90 of base 52 until the handle 56 is raised its maximum distance. This causes the central longitudinal axis of the plunger rod $x_2$ to offset from the central longitudinal axis of the bore $x_1$ even further to a distance of $d_2$. As discussed hereinabove, this causes the plunger rod 74 to contact the relief valve post 40 at a lower point than is the case when the handle is downwardly actuated (see FIG. 6). The lower point of contact allows the relief valve post 40 to clear the plunger rod 74 sooner, resulting in earlier closure of the relief valve 28 and reduced open time for the flush valve 5, thereby leading to a reduced flow amount through the flush valve 5.

Figure 7:
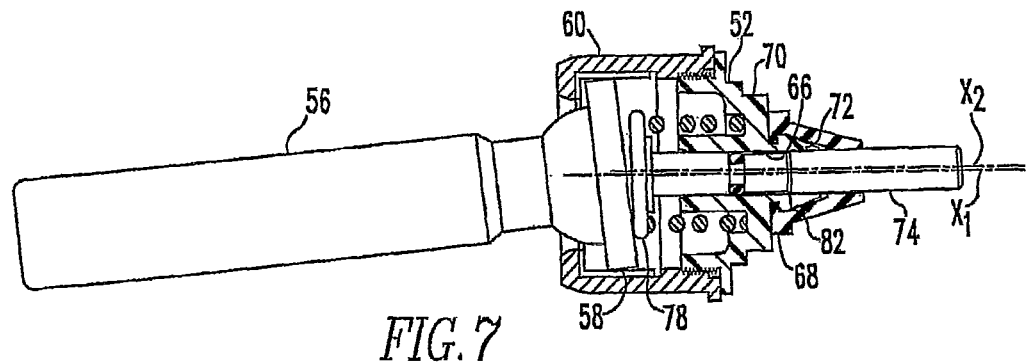
FIG. 7 is a cross-sectional view of the flush actuator assembly of FIG. 2A with a handle thereof in a partially lowered position.
Figure 8:
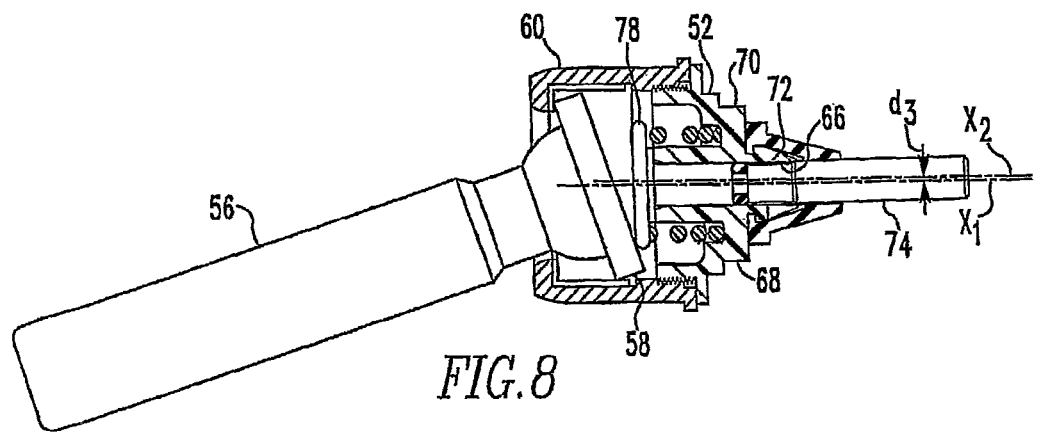
FIG. 8 is a cross-sectional view of the flush actuator assembly of FIG. 2A with a handle thereof in a fully lowered position.

With specific reference to FIGS. 7 and 8, as a user lowers the handle 56, the forces generated by the handle 56 and the spring 80 force the plunger rod 74 to travel within the bore 66 such that the central longitudinal axis of the plunger rod $x_2$ is only slightly offset from the central longitudinal axis of the bore $x_1$. For instance, the central longitudinal axis of the plunger rod $x_2$ may be offset from the central longitudinal axis of the bore $x_1$ by a distance $d_3$ which is less than the distance $d_2$. The beveled nose 72, which extends 180° around the circumference of the body portion 76 of plunger rod 74, prevents recessed area 82 of body portion 76 of plunger rod 74 from creating a larger offset between the central longitudinal axis of the plunger rod $x_2$ and the central longitudinal axis of the bore $x_1$. The offset is determined by the clearance between the outside diameter $d_{R1}$ of the plunger rod 74 and the inside diameter $d_B$ of the bore 66.

Figure 9:
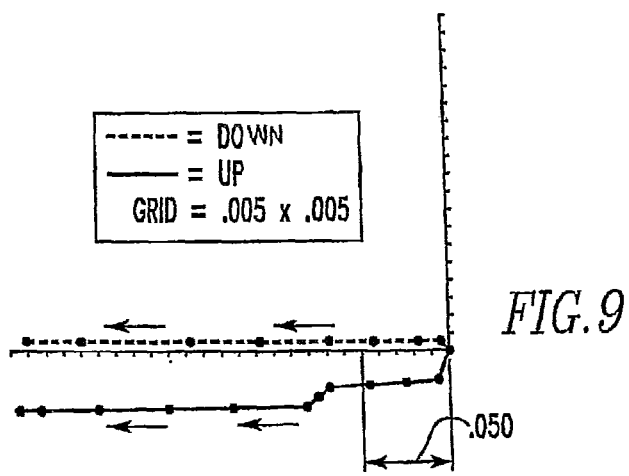
FIG. 9 is a graph illustrating the range of motion of an end of the plunger rod when the handle is pulled up and the handle is pushed down.

With reference to FIG. 9, the path relative to the end of the plunger rod 74 that contacts the relief valve stem is graphically illustrated based on the results of testing with an optical comparator. During the test, the handle 56 was slowly raised and lowered and the position of the end point of the plunger rod 74 was graphed at various points along its path of travel. As can be seen in the graph, as the handle is raised, the plunger rod 74 travels along a lower interior portion 100 of the bore 66, such that a central longitudinal axis of the plunger rod $x_2$ is offset from a central longitudinal axis of the bore $x_1$ by a predetermined distance $d_3$. As the handle is lowered, the plunger rod 74 travels along an upper interior portion 102 of the bore 66, such that the central longitudinal axis $x_2$ of the plunger rod 74 is offset from the central longitudinal axis of the bore $x_1$ by a predetermined distance $d_3$ that is less than the predetermined distance $d_3$.

It is preferable that the base or bushing 52 is made of a polymeric resilient material. Alternatively, the base or bushing may be made of other materials such as brass or metal. The force against the bushing, surfaces when the handle is pushed down or pulled up causes deformation of the base 52 resulting in a plunger path that is substantially parallel when the handle is pushed down or pulled up as shown in FIG. 9.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. For example, it is to be understood that the present invention contemplates that, to the extent possible, one or more features of any embodiment can be combined with one or more features of any other embodiment.

The invention claimed is:

1. A flush actuator for use with a flush valve comprising:
   a) a base comprising a bore extending therethrough between a lower portion and an upper portion, the upper portion including a beveled nose extending from an end thereof beyond the lower portion;
   b) a plunger rod positioned within and guided by the bore of the base, the plunger rod comprising a body portion having a first diameter and a recessed area formed in the body portion with a second diameter that is less than the first diameter; and c) a handle mounted to the base which when moved displaces the plunger rod within the bore of the base, wherein, if the handle is lowered, the plunger rod travels within the bore, such that the central longitudinal axis of the plunger rod is offset from the central longitudinal axis of the bore by a first predetermined distance, and, if the handle is raised, the plunger rod travels within the bore, such that a central longitudinal axis of the plunger rod is offset from a central longitudinal axis of the bore by a second predetermined distance.

2. The flush actuator assembly according to claim 1, wherein the first predetermined distance is less than the second predetermined distance.

3. The flush actuator assembly according to claim 1, wherein the beveled nose of the upper portion of the base extends 180° around an upper area of the plunger rod.

4. The flush actuator assembly according to claim 1, further including a spring between the base and a first end of the plunger rod to bias the plunger rod in a retracted position.

5. The flush actuator assembly according to claim 1, wherein the base includes an end portion that is threaded to be compatible with matching threads on a mounting bore in a valve body of the flush valve.

6. A flush valve comprising:
a) a valve body having an inlet and an outlet;
b) a valve seat formed in the body between the inlet and outlet;
c) a flexible diaphragm above the valve seat defining a lower chamber in fluid communication with the inlet and an upper chamber, wherein in a closed position, the diaphragm is urged against and seals the valve seat and, wherein in an open position, the diaphragm is relaxed and spaced from the valve seat, such that the inlet is in fluid communication with the outlet;
d) a diaphragm by-pass between the upper and lower chambers, whereby fluid from the inlet passes into the upper chamber and pressurizes the upper chamber to urge the diaphragm into the closed position;
e) a relief valve to relieve pressure from the upper chamber, thereby allowing the diaphragm to displace from the valve seat to provide fluid communication between the inlet and the outlet, wherein the relief valve is comprised of a valve seat seal and a post longitudinally extending therefrom; and
f) a flush actuator assembly mounted upon the valve body to displace the relief valve post comprising:
i) a base comprising a bore extending therethrough between a lower portion and an upper portion, the upper portion including a beveled nose extending from an end thereof beyond the lower portion;
ii) a plunger rod positioned within and guided by the bore of the base, the plunger rod comprising a body portion having a first diameter and a recessed area formed in the body portion with a second diameter that is less than the first diameter; and
iii) a handle mounted to the base which when moved displaces the plunger rod within the bore of the base, wherein, if the handle is lowered, the plunger rod travels within the bore, such that the central longitudinal axis of the plunger rod is offset from the central longitudinal axis of the bore by a first predetermined distance, and, if the handle is raised, the plunger rod travels within the bore, such that a central longitudinal axis of the plunger rod is offset from a central longitudinal axis of the bore by a second predetermined distance.

7. The flush valve according to claim 6, wherein the first predetermined distance is less than the second predetermined distance.

8. The flush valve according to claim 6, wherein the beveled nose of the upper portion of the base extends 180° around an upper area of the plunger rod.

9. The flush valve according to claim 6, further including a spring between the base and a first end of the plunger rod to bias the plunger rod in a retracted position.

10. A method of adjusting the fluid flow through a flush valve comprising:
a) providing a flush actuator for use with the flush valve comprising:
i) a base comprising a bore extending therethrough between a lower portion and an upper portion, the upper portion including a beveled nose extending from an end thereof beyond the lower portion;
ii) a plunger rod positioned within and guided by the bore of the base, the plunger rod comprising a body portion having a first diameter and a recessed area formed in the body portion with a second diameter that is less than the first diameter; and
iii) a handle mounted to the base which when moved displaces the plunger rod within the bore of the base;
b) lowering the handle, such that the plunger rod travels within the bore causing the central longitudinal axis of the plunger rod to be offset from the central longitudinal axis of the bore by a first predetermined distance, thereby providing a first flush volume; and
c) raising the handle, such that the plunger rod travels within the bore, such that a central longitudinal axis of the plunger rod is offset from a central longitudinal axis of the bore of the base by a second predetermined distance, thereby providing a second flush volume.

11. The method according to claim 10, wherein the first flush volume is greater than the second flush volume.

12. The method according to claim 10, wherein the first predetermined distance is less than the second predetermined angle.

13. The method according to claim 10, wherein the beveled nose of the upper portion of the base extends 180° around an upper area of the plunger rod.

14. The method according to claim 10, wherein the base includes an end portion that is threaded to be compatible with matching threads on a mounting bore in the valve body.

\* \* \* \* \*